United States Patent [19]

Davis et al.

[11] 3,769,677

[45] Nov. 6, 1973

[54] REGISTERING OF TRANSVERSELY CORRUGATED ELEMENTS

[75] Inventors: Dan Bryan Davis, Ile Perrot; Bretislav Paul Zuber, Montreal, both of Quebec, Canada

[73] Assignee: Northern Electric Company, Limited, Montreal, Quebec, Canada

[22] Filed: Feb. 25, 1972

[21] Appl. No.: 229,320

[52] U.S. Cl. ............................................. 29/200 P
[51] Int. Cl. .......................................... B23p 19/00
[58] Field of Search .................... 29/200 B, 200 R, 29/200 P, 429

[56] References Cited
UNITED STATES PATENTS
3,474,514    10/1969    Lombardi...................... 29/200 B

*Primary Examiner*—Thomas H. Eager
*Attorney*—Sidney T. Jelly

[57] ABSTRACT

Apparatus for correctly registering a transversely corrugated butt strap in position over the butt joint of a corrugated butt joint tube. Strap and tube are passed between guide rolls which progressively force the strap and tube into correct registration -for soldering.

4 Claims, 5 Drawing Figures

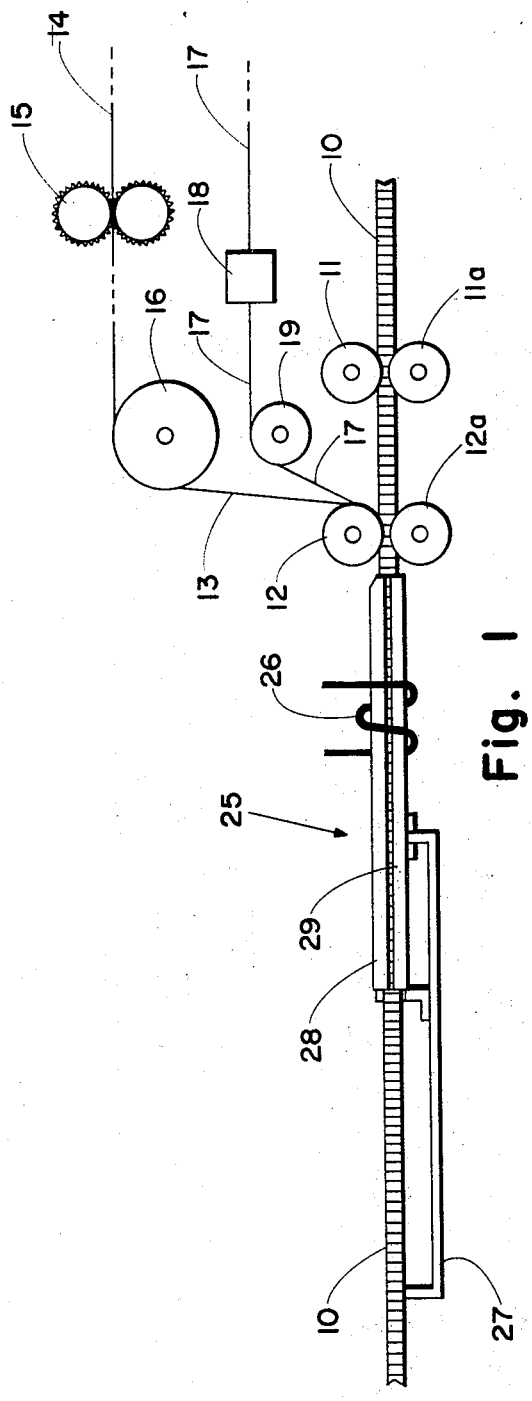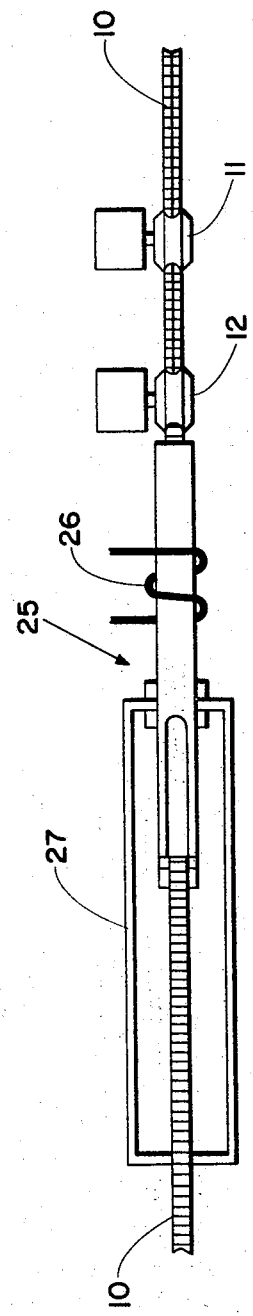

REGISTERING OF TRANSVERSELY CORRUGATED ELEMENTS

This invention relates to the registering of transversely corrugated elements, and in particular the registering of transversely corrugated member for forming into a tube.

A particular example to which the present invention can be applied is the registering of a thin relatively narrow transversely corrugated butt strap with a tube formed from a transversely corrugated strip, the butt strap covering the butt joint of the tube for eventual soldering. A typical example of such a tube is one as disclosed in U.S. Pat. No. 3,634,606 issued January 11, 1972.

In the manufacture of butt joint corrugated tubes having a butt strap, it is necessary to position the butt strap and a solder strip over the butt joint such that the corrugations mate and also so that the butt strap is caused to conform to the shape of the tube. The butt strap should be positioned centrally over the joint and be in close contact with the tube to ensure complete and satisfactory soldering of the butt strap to the tube.

It is desired to bring the various elements together and produce soldered tube continuously at speeds approaching one hundred fee per minute with consistency.

Previously tubes have been made with an overlap joint and fixed dies have been used to press the edges into register. Friction forces are high, as in wear, and damage can occur. The present invention avoids such disadvantages, as will become apparent.

Broadly the present invention comprises moving dies which guide the joint elements into correct positional relationship and push the corrugations of the elements into complete and accurate registration. With a butt joint, the butt strap is curved to conform with the cross-section of the tube and is guided so as to overlay the butt joint in the tube. The moving dies can be arranged to provide guidance for the butt strap and also for the tube, prior to and during engagement of the butt strap with the tube.

The invention will be readily understood by the following description of one embodiment, by way of example, in conjunction with the accompanying drawings, in which:

FIG. 1 is a diagrammatic side view of an apparatus embodying the present invention;

FIG. 2 is a plan view of the apparatus of FIG. 1;

Figure 3:
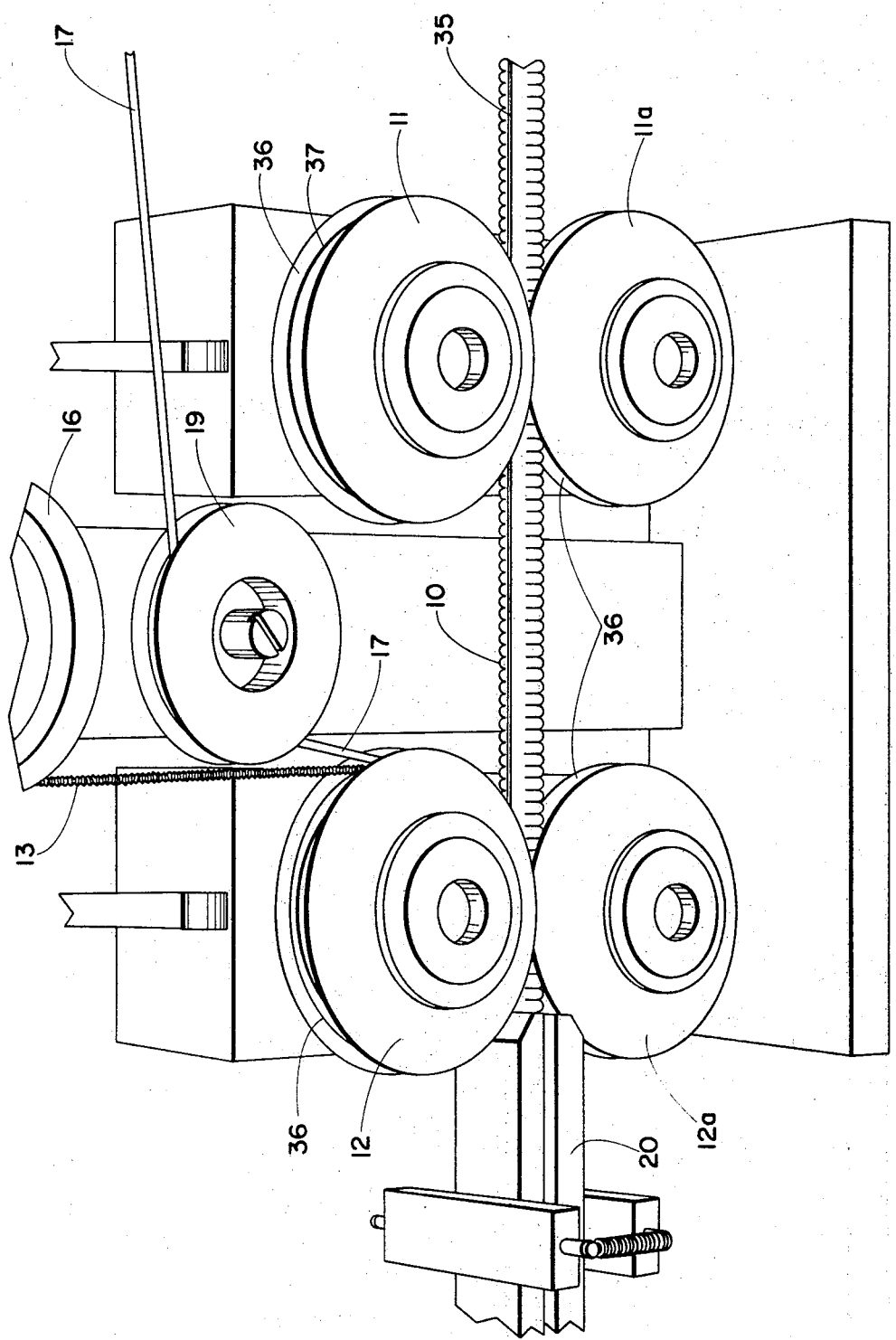
FIG. 3 is a perspective view of a particular arrangement of moving dies, in accordance with the present invention.

FIGS. 1 and 2 illustrate diagrammatically a particular arrangement for soldering a corrugated butt strap over the butt joint of a corrugated tube. The corrugated tube 10 is formed from a strip of material, for example a copper/tinned steel laminate, which is first transversely corrugated and then formed into a tube having a butt joint. The tube is fed through two pairs of rolls 11, 11a and 12, 12a described in more detail later. A butt strap 13 is formed from a strip of tinned steel 14 which is fed through transverse corrugating rolls 15, over a guide-roll 16 and then down into the nip between the pair of rolls 12 and 12a. A strip of solder 17 is fed through a flux applying station 18, over a guide roll 19 and again down into the nip of the rolls 12 and 12a. The solder strip 17 is positioned between the butt strap 13 and the tube 10.

From the second pair of rolls 12 and 12a the tube 10, with butt strap 13 and solder strap 17, passes into a soldering member 25. A heating coil 26 heats the tube as it passes through the soldering member melting the solder, after which the tube is cooled in a cooling section positioned in a trough 27. The tube finally issues from the soldering member 25, passes through the trough 27, and is then wound up. Resilient clamps hold together the two parts 28 and 29 forming the soldering member 25. The soldering member is supported on -or floats on- the tube which thus is not restricted in its path but at the same time the tube and butt strap are held firmly together with the corrugations in register to give a close and effective joint. In FIG. 2 the corrugating rolls 15, fluxing station 18 and guide rolls 16 and 19 are omitted for clarity.

Figure 4:
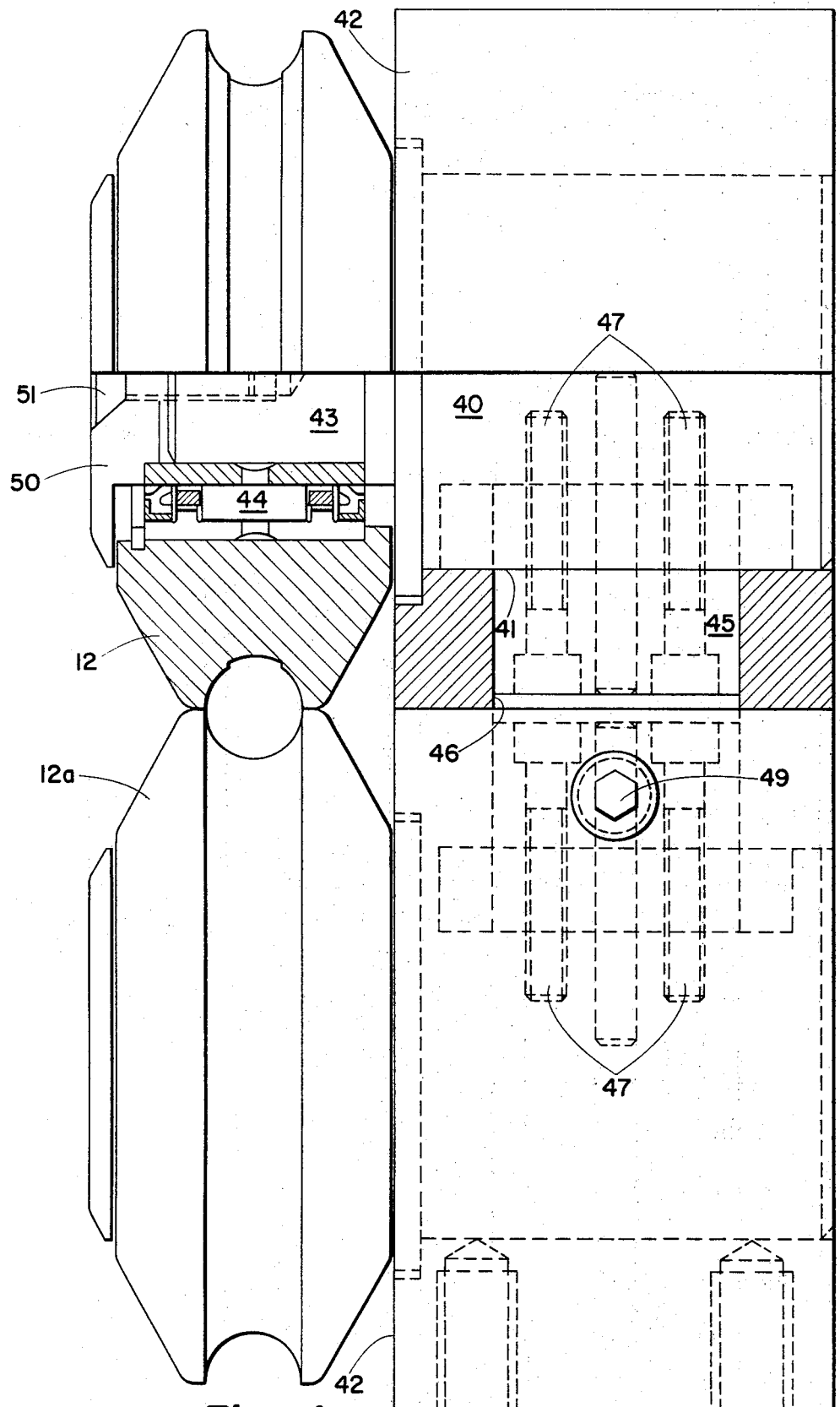
FIG. 4 is an end view of one pair of moving dies, one die shown partly in section.
Figure 5:
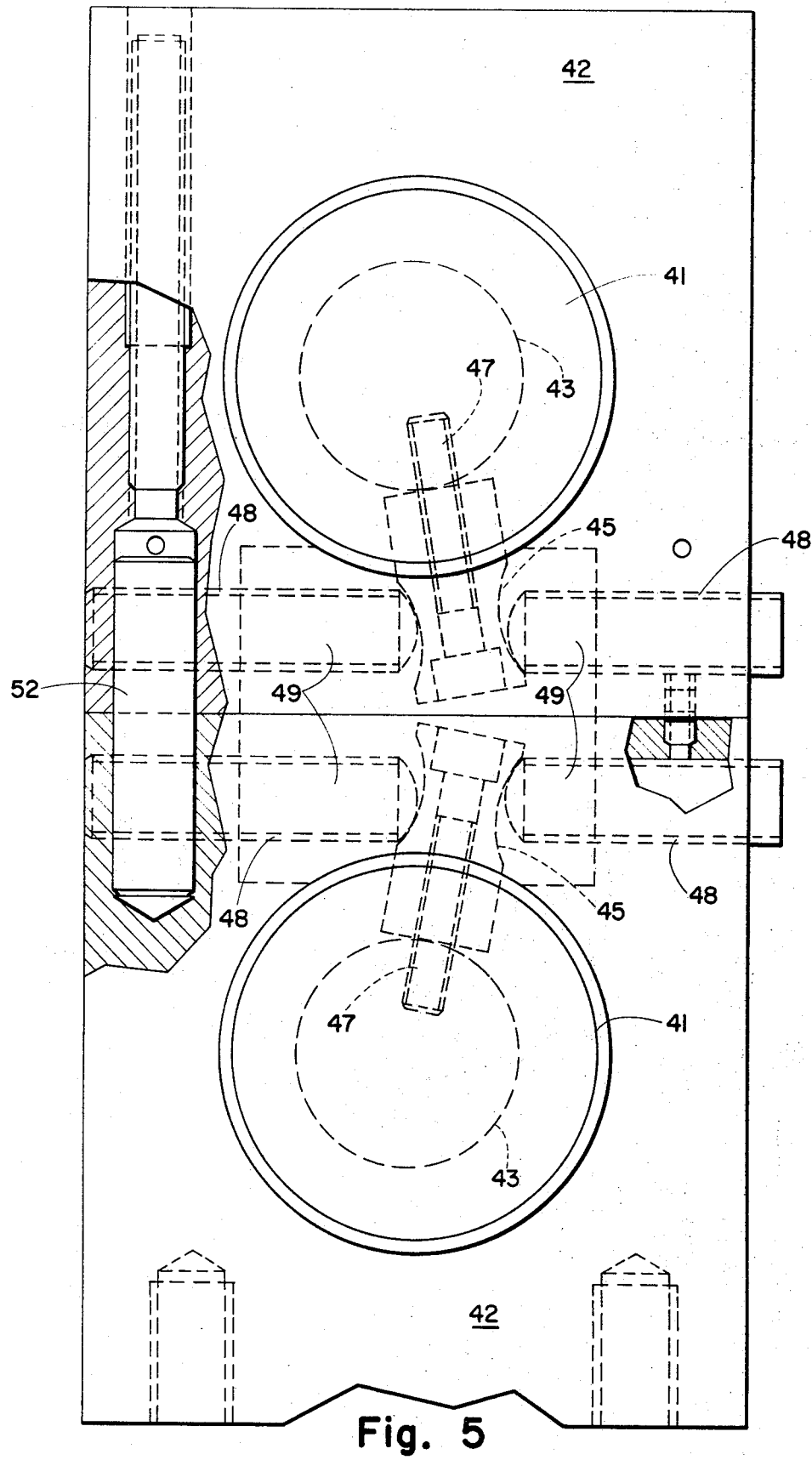
FIG. 5 is a side view of the die illustrated in FIG. 4.

FIG. 3 illustrates in more detail the pairs of rolls 11, 11a and 12, 12a, while FIGS. 4 and 5 illustrate the mounting of these rolls. As seen in FIG. 3 the tube 10, with its butt joint 35 uppermost, is fed between the first pair of rolls 11, 11a, then passes to the second pair of rolls 12, 12a. The peripheries of the rolls are grooved at 36, having a cross-section corresponding to the cross-section of the tube. This is seen in FIG. 4, which is of the rolls 12 and 12a. The rolls 11 and 11a are of the same form with the exception that the upper roll 12 has a recess as will be described.

The upper roll 11 has a thin rib 37 extending peripherally in the centre of the groove 36. This thin rib locates in the butt joint 35 and ensures that the tube 10 passes through the rolls 11, 11a, and also the rolls 12, 12a, with the butt joint on top and centrally positioned.

The upper roll 12 has a shallow recess 38 (FIG. 4) in the groove 36. Recess 38 is of such a width and depth that it will accept the butt strap 13 and act to position and guide the butt strap relative to the butt joint of the tube 10. Thus it is determined that the butt strap 13, with the intervening solder strip 17, is correctly positioned over the butt joint before the whole passes into the soldering member.

The upper roll 12 also forms the butt strap 13 into an arcuate form, viewed in cross-section normal to the length of the strap, which mates with the tube 10. As the butt strap enters between the rolls 12a and the tube 10 it is bent into the arcuate cross-section and the corrugations of the butt strap are forced into register with the corrugations of the tube 10. The edges of the strip formed to make the tube 10 butt together and the tube acts as a mandrel for the shaping and pressing of the butt strap. The butt strap is thinner and more flexible than the material which forms the tube 10.

At the point where the butt strap meets the tube there is negligible relative motion between the butt strap and the roll 12. Roll 12 acts as a moving die and as there is little or no relative movement there is no friction between roll and butt strap. This avoids the possibility of damage to the rather flexible butt strap and also reduces wear on the roll or die, 12. At the point where the profile formed by the upper and lower rolls 12 and 12a, matches the cross-section of the tube, the forces acting on the butt strap and tube -pushing the corrugations into register- are radial related to the roll centers. Thus the forces are normal to the axis of the tube at the point of maximum closure, giving effective engagement of the butt strap corrugations with the tube corrugations. The butt strap is drawn into the mating point positively by the engagement of successive convolutions of the butt strap with the convolutions of the moving tube.

As the tube passes through the apparatus it is stretched slightly. Also the material of which the tube is formed is stiffer than the material of the butt strap. To obtain satisfactory register it is necessary that the butt strap is stretched slightly as it engages with the tube. The roll 12, acting as a moving die element, ensures that any necessary stretching occurs.

With the use of rolls 11, 11a and 12a also, the tube is effectively acted upon by moving dies, and little or no frictional forces occur on the tube. The loading of the rolls 11, 11a and 12, 12a on the tube can be readily adjusted by supporting the rolls in supports which provide some degree of adjustment in the distance between the centres of the rolls.

FIGS. 4 and 5 illustrate one example of adjustable supports for rolls 11, 11a 12 and 12a. In this example rolls 12 and 12a are shown but the support arrangement can be the same for rolls 11 and 11a. As can be seen in FIG. 4, each roll is mounted on a stub shaft 40. The stub shaft 40 has a main diameter portion 41 which is rotational carried in a support housing 42, and a reduced diameter portion 43 which carries a roller bearing 44. The roll is carried on the roller bearing 44. The main diameter portion 41 has a radially extending web 45 which extends into a cavity 46 formed in the support housing 42. Conveniently the radial web 45 is a separate member attached to the stud shaft 40, for example by means of screws 47. Threaded holes 48 are formed in the support housing 42, extending in a direction normal to the axis of the stub shaft 40 and entering the cavity 46. Set screws 49 are positioned in the threaded holes 48 with their inner ends in contact with the web 45. By suitable adjustment of the set screws 49 the stub shaft 40 can be rotated in one direction or the other by the screws acting on the web 45. The reduced diameter portion 43 is slightly eccentric relative to the main diameter portion 41. Therefore rotation of the stub shaft 40 in the support housing 42 can be arranged to move the rolls in a plane normal to the rotational axis of the roll. Thus, it is possible to move the rolls of a pair towards or away from each other. The rolls are held on the stub shafts 40 by thrust washers 50 held in place by screws 51 screwed into the end of the reduced diameter portion 43. The support housings of a pair of rolls are located in correct relationship by dowels 52. Other ways of providing adjustment of the rolls can be provided by the example illustrated is efficient and easy to adjust. Further, if a change in size of tube to be soldered occurs, it is very easy to change the rolls.

The invention overcomes the difficulties associated with previous arrangements by the use of moving dies, in the example illustrated and described in the form of rolls. The friction and wear are reduced, damage to the butt strap is avoided and the registration of the corrugations of the butt strap and tube is positive and accurate. Good close soldered joints will be obtained. The obtaining of good quality joints and maintenance of the circular cross-section of the tube is most important in coaxial cables, in which the corrugated tube acts as an outer conductor. The present invention is particularly suitable for the manufacture of such cables.

The invention can also be used for other forms of tubes including tubes with lap joints. For a lap joint, the rolls can be arranged to guide the separate elements of the joint, that is the overlapping portions of the tube, into correct relationship. With overlapping joints it is still important that the corrugations be brought into complete registration, to avoid bad spots in the joint. The arrangement described and illustrated can also be used inverted, that is with the butt strap, and solder, fed in at the bottom instead of at the top, the butt joint in the tube similarly being at the bottom.

What is claimed is:

1. Apparatus for the registering of the transverse corrugations in a joint of a corrugated tube, said joint a butt joint covered by a butt strap, the apparatus comprising: first and second pairs of opposed rolls, the rolls in a common plane, the axes of the rolls substantially parallel and normal to said plane; a concave profile periphery on each roll, the profile conforming to the cross-section of the tube; one of said second pair of rolls including a peripherally extending recess in said profile for the acceptance and positioning of said butt strap; the whole so constructed and arranged that the transverse corrugations of the butt strap are continuously and progressively pressed into register with the corrugations of the tube.

2. Apparatus as claimed in claim 1, one of said first pair of rolls including a peripheral extending rib in said profile, said rib adapted to engage between the butting edges of the tube for guiding the tube through said second pair of rolls, said one of the first pair of rolls and said one of the second pair of rolls in alignment on the same side of the tube, the arrangement such that the butt strap is positioned substantially centrally over the butt joint.

3. Apparatus as claimed in claim 2 including means for feeding the butt strap to the nip of said second pair of rolls and means for feeding a solder strip to the nip of said second pair of rolls, the solder between the butt strap and the tube.

4. Apparatus as claimed in claim 3, at least one roll of each pair mounted in an adjustable support, whereby the distance between the axes of the rolls of each pair can be adjusted.

* * * * *